United States Patent
Kullberg

Patent Number: 6,132,140
Date of Patent: Oct. 17, 2000

[54] METHOD FOR THE FABRICATION OF A DAM OR BARRIER

[76] Inventor: Sten Kullberg, Vårbruksgatan 21, 583 32 Linköping, Sweden

[21] Appl. No.: 09/011,277
[22] PCT Filed: Aug. 9, 1996
[86] PCT No.: PCT/SE96/01002
§ 371 Date: Feb. 10, 1998
§ 102(e) Date: Feb. 10, 1998
[87] PCT Pub. No.: WO97/07290
PCT Pub. Date: Feb. 27, 1997

[30] Foreign Application Priority Data

Aug. 11, 1995 [SE] Sweden .................. 9502817

[51] Int. Cl.[7] ............. E02B 3/10; E02D 19/00; E02D 19/02
[52] U.S. Cl. ........... 405/114; 52/169.14; 405/90; 405/102; 405/107
[58] Field of Search ............ 52/63, 169.14; 405/90, 98, 100, 102, 103, 104, 105, 107, 114

[56] References Cited

U.S. PATENT DOCUMENTS

| | | | |
|---|---|---|---|
| 596,755 | 1/1898 | Marshall | 405/102 |
| 1,120,787 | 12/1914 | Bebout | 405/102 |
| 1,624,571 | 4/1927 | Aubert | 405/102 |
| 2,701,953 | 2/1955 | Travilla | 405/102 |
| 3,083,539 | 4/1963 | Foster | 405/6 |
| 3,775,983 | 12/1973 | Aubert | 405/102 |
| 4,136,995 | 1/1979 | Fish | 405/115 |
| 4,321,774 | 3/1982 | Fish | 52/63 |
| 4,352,592 | 10/1982 | Aubert | 405/102 |
| 4,692,060 | 9/1987 | Jackson, III | 405/115 |
| 4,875,549 | 10/1989 | Denny et al. | 52/63 X |
| 4,921,373 | 5/1990 | Coffey | 405/115 |
| 5,040,919 | 8/1991 | Hendrix | 405/115 |
| 5,118,217 | 6/1992 | Younes | 405/114 |
| 5,178,490 | 1/1993 | Snowberger et al. | 405/102 |
| 5,222,834 | 6/1993 | Schultz | 405/94 |
| 5,470,177 | 11/1995 | Hughes | 405/107 X |
| 5,758,989 | 6/1998 | Snowberger | 405/102 X |

FOREIGN PATENT DOCUMENTS

| 3527100 | 2/1987 | Germany | E02B 7/20 |
|---|---|---|---|
| 2269618 | 2/1994 | United Kingdom | E02B 7/20 |

*Primary Examiner*—Eileen Dunn Lillis
*Assistant Examiner*—Tara L. Mayo
*Attorney, Agent, or Firm*—Hayes, Soloway, Hennessey, Grossman & Hage, P.C.

[57] ABSTRACT

A water dam includes a number of loading pallets arranged side-by-side and inclined outward from the water supported by supports. Membranes are placed on loading pallets and extend a distance in front of the pallets under the water. The membranes may be held down in the front edge by stones, sand bags, etc. initially to hold the membrane in place. The supports are triangular and made of U-shaped sheet metal beams. The one on which the pallets rest grips over the adjoining legs of two loading pallets to hold these together. To the rear the support is extended sufficient to secure that it cannot be tilted by the water. To achieve this and achieve a good grip on the ground the inclination is preferably 45°, resulting in great vertical forces on the ground, a good grip on the ground.

16 Claims, 5 Drawing Sheets

METHOD FOR THE FABRICATION OF A DAM OR BARRIER

BACKGROUND OF THE INVENTION

In order to control flood waters and to reduce the damage caused by flooding, it is known to build dams and barriers to contain the flood waters in different ways and with different devices. Most widely known is the use of sandbags, but this requires a great amount of work and also requires access to a sufficient amount of sand and bags. Furthermore, it is known to fill tube-like structures with water and anchor them on site. This will achieve damming relatively fast since water can quickly be pumped into the tube-like devices. These devices however are comparatively expensive. Furthermore, since the water-filled tubes (in comparison to the sandbags) are not heavier than the water, the barrier might be altogether removed by the lifting force exerted by the flood waters. It has been presumed therefore, that flood protection requires a great weight, even if this necessitate excessive time and work and consequently result in limiting one's ability to fight floods.

To sum up, one can say that the ways that are available today for the damming up and containment of water and controlling floods are not satisfactory. They are either too expensive or require too much time and work to be effective.

SUMMARY OF THE INVENTION

In view of the above there is a need of a more practical way to achieve the damming of flood waters in catastrophic situations, that is fast and that does not require large investments.

The invention has as its objects to provide an extremely stable low cost protection from flood waters which can be constructed quickly, in large lengths, by placing loading pallets side by side in such a way that they are inclined outward from the water. A suitable membrane, tarpaulin or the like, is applied on the waterside of the inclined loading pallets. The bottom edge portion of the membrane or tarpaulin is preferably weighted down by stones, sandbags or even loose dirt or sand, in order to secure the bottom edge portion of the membrane to the ground. The water pressure exerted by the arriving flood waters will help to keep the membrane pressed down against the ground and against the loading pallet. The loading pallets are held in place at the intended angle by supporting means preferably triangular in shape. The water force exerted on the loading pallets atop the supporting means as well as laterally hold the structure in place.

The inclination of the loading pallet to the ground must be chosen so that the force exerted by the water pressure will not cause the structure to tilt over as the water level rises. Also, in order to utilize sufficient vertical force to enable the dam to obtain sufficient friction grip with or on the ground. The inclination must not be too steep. However, the inclination must be steep enough to provide an effective dam height. A inclination angle of 45° has been found to be a good choice.

In order to cope with the vertical loads and to prevent the supports from sinking down through the ground which has been softened by the penetration of water, additional loading pallets preferably turned up side down on the ground may be used as a brace for the supports.

In order to cope with the horizontal forces of the water, spikes or the similar anchoring device pushed into the ground at the outward edge of the support, or, if used, the loading pallet lying upside down on the ground, may be used if the friction generated by the vertical forces are insufficient to keep the barrier in place. Often, there will be curb stones, trees or other objects against which the supports may be braced. Also, the membrane itself will contribute to keeping the loading pallets in place, since the membrane is pressed by the water against both the ground and the loading pallets respectively with considerable force. In particular, with a broad contact area of the membrane against the ground, large forces are achievable.

The support means for the loading pallets are preferably designed in such a way as to be foldable or collapsible in some other way so that they are easily transported or stored. The location or positioning of the loading pallets and the support means may be accomplished by gripping, snapping or even nailing or screwing. Since the loading pallets achieve such a large vertical force due to their inclination, friction will normally provide a satisfactory locking horizontally.

The use of loading pallets has a number of advantages. To start with they are very strong and are therefore capable of handling the loads in question. Secondly, and also important, is that loading pallets are almost always available in very large quantities. Furthermore the replacement cost is low in case they should be destroyed. More than likely, however, they will be reused as loading pallets once the dam is removed. In addition by, arranging the loading pallets on their sides with the largest dimension lengthwise or on their ends for greater height, an immediate response to the required needs with respect of length or height may be achieved.

The fabrication of a dam or water barrier according to the described invention results in greater efficiency and lower cost in comparison with prior art. The method may seem simple, but in view of the known technique, is not close at hand. One reason why is, presumably, that no one has considered that it is possible to achieve a simple low cost dam made of material that can actually float on water, and would not otherwise seem to be able to withstand the force of the flood waters. As has been described the necessary forces to hold back the water can, however, be provided by the weight of the water itself.

The support means also allows quick mounting despite the small transport or storage volume since the support quickly can be transferred from a transport position to its working position. Since the entire method requires a relatively small amount of separate steps or manipulation, a dam or barrier can be achieved very simply, that is, a person only has to execute only a few repetitive steps and consequently, does not have to think about what is to be done next all the time. Also every one can quickly understand and handle the invented support.

DESCRIPTION OF THE PREFERRED EMBODIMENTS

Figure 1:
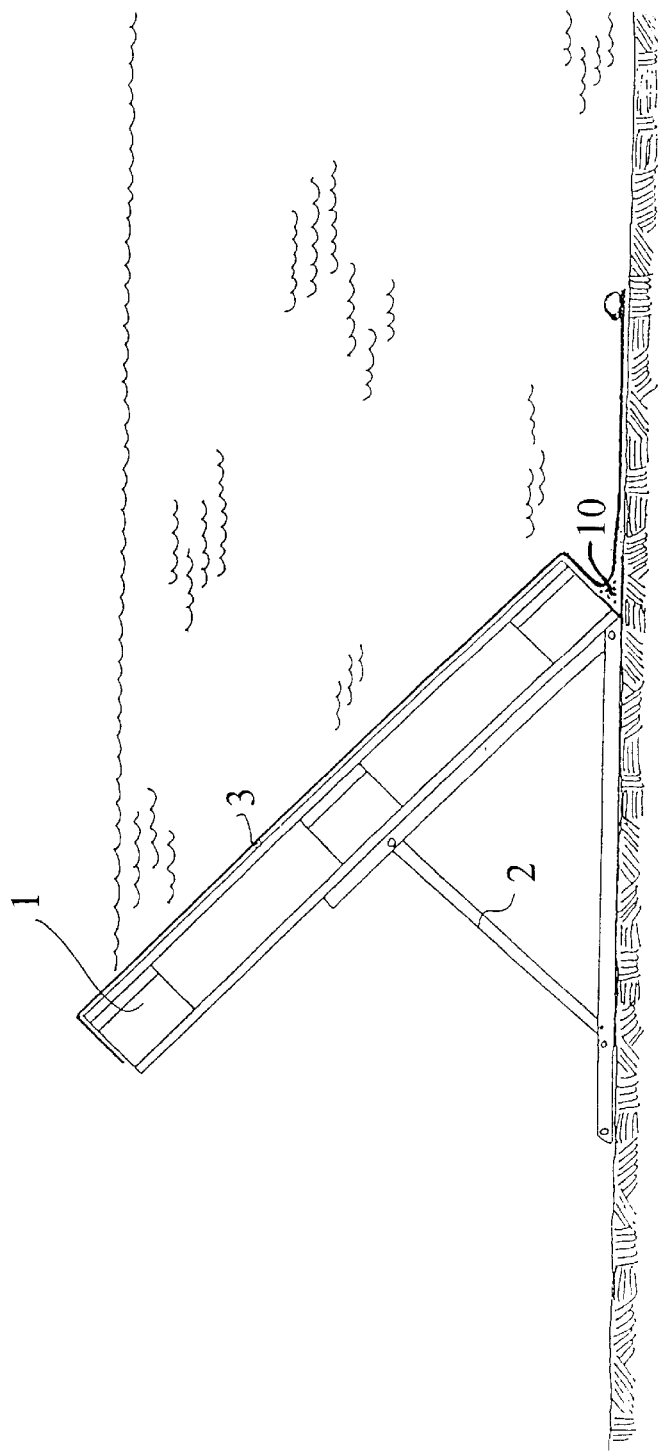
FIG. 1 is a cross section view showing a dam in use in accordance with this invention.

The dam shown in FIG. 1 shows inclined loading pallet 1 at a 45° angle in relation to the ground. The loading pallet is maintained at this angle by support means 2. On the side of the loading pallet facing the water is a membrane 3. Membrane 3, which may be a tarpaulin or the like, is placed extending from the upper edge of the loading pallet down over the upper surface of the loading pallet and a distance along the ground at the bottom of the water. The membrane can be fastened at the upper end of the loading pallet by means of clamps, or nails or screws or the like, or may otherwise be held onto the loading pallet. At the transition area between the loading pallet and the ground, preferably gravel 10 or other suitable material may be arranged as a filler. Alternatively, the membrane maybe so placed that it follows the contour of the transition area between the loading pallet and the ground so that the membrane will not be stretched and torn apart by the water pressure. Many of the membranes that are available on the market are so strong that they can handle the folds and stresses that may result without problem. The lower edge portion of membrane 3, at the bottom of the water is held against the ground by gravel 10, stones sandbags or something else placed thereon. Since the membrane is held down by the water pressure exerted against it, it is only necessary that there be sufficient amount of stones or sandbags to prevent the membrane from being swept up by movement or force of the water when it first arrives.

Figure 2:
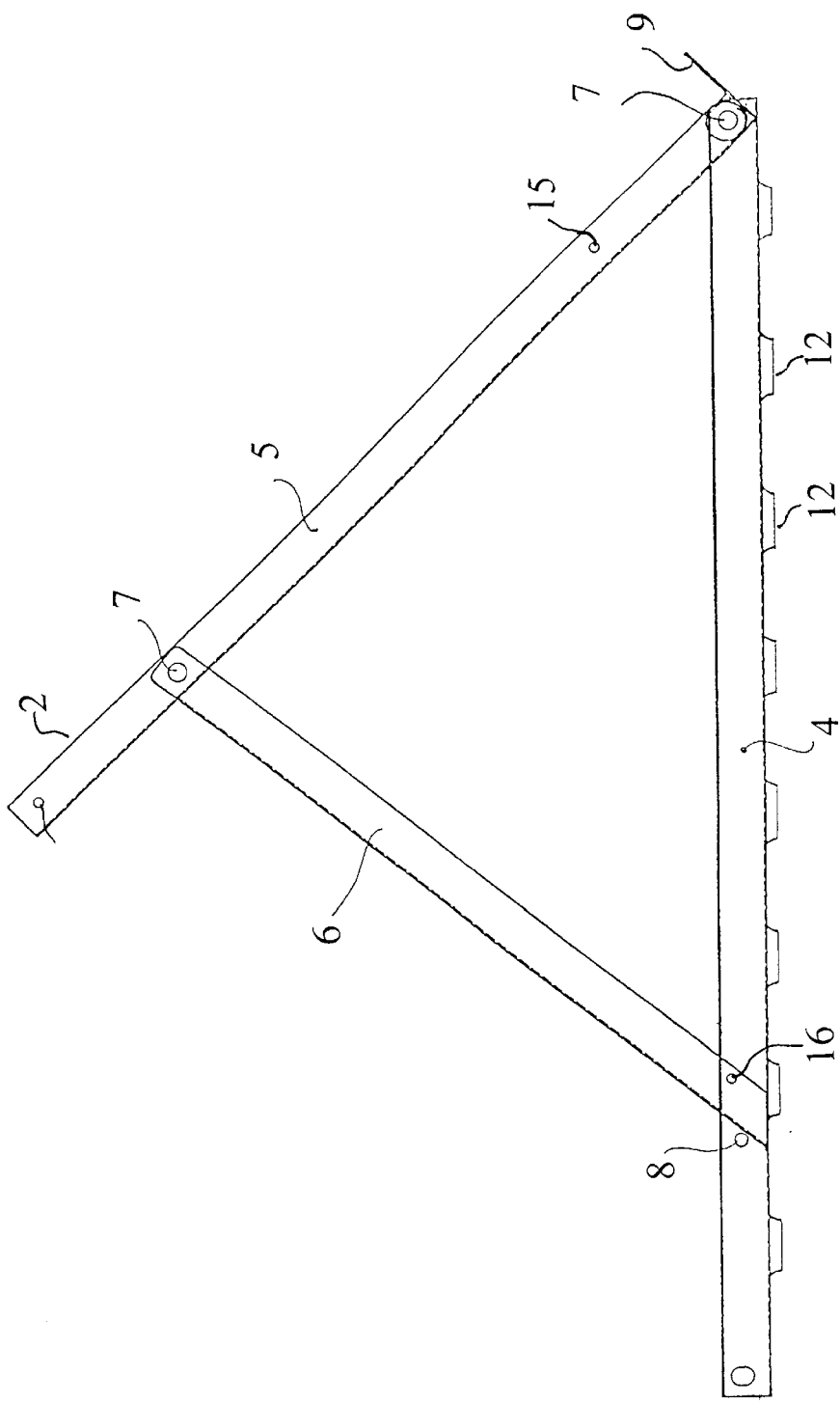
FIG. 2 is an enlarged cross section view of a support moans set up for use in accordance with the present invention.
Figure 3:
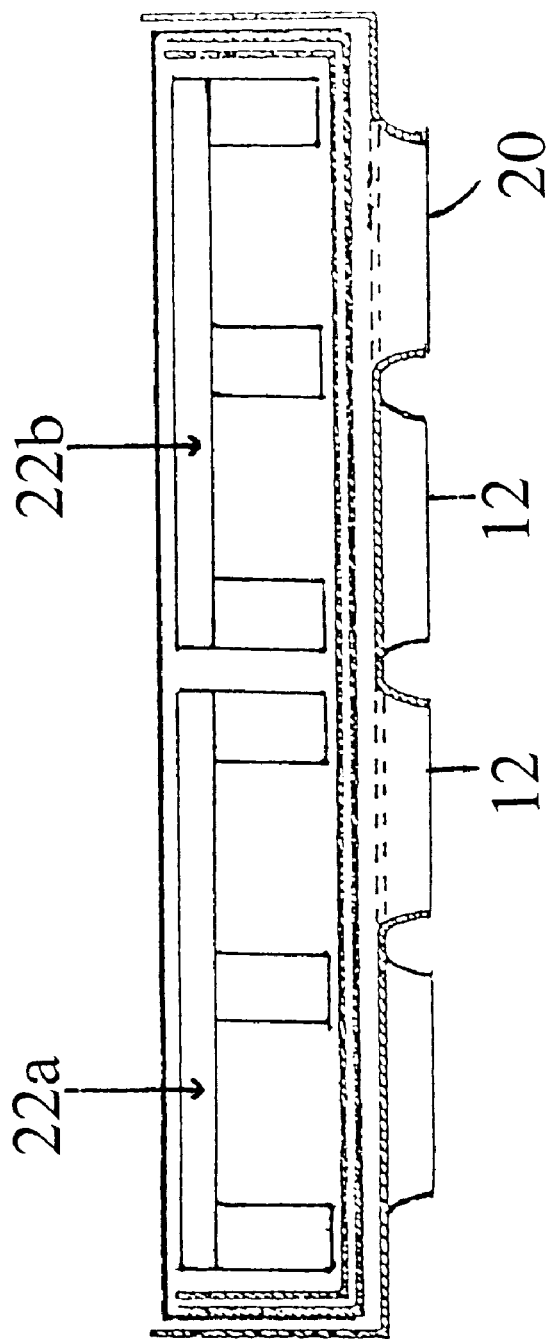
FIG. 3 is a cross sectional view or the support means folded for transport or storage, taken along line III—III of FIG. 4.

Referring to FIG. 2, the support means 2 is comprised essentially of three parts: a lower or bottom beam or part 4, an inclined beam or part 5 for a loading pallet to lie on and a third inclined beam or part 6 extending between the two first mentioned beams fixing the shape. The beams are preferably U-shaped metal profiles of varied widths so that they may be folded into each other for storage and transport in the way that is shown in FIG. 3. The lengths of the three parts are adapted so that the intended angled inclination of 45° is obtained for the loading pallets. Part 5, that is in contact with the under side of the loading pallet is connected at its lower end by bolt 7 to lower beam 4 and also to third beam 6 which extends between part 5 and lower 4 establishing the incline. Bolts 7 are arranged in the flanges of the beams so that the beams will be hingedly connected to each other in two of the corners of the triangle. The bolts are not fastened tightly which would reduce movability and the holes are sufficiently wide to allow the beams to rest on each other instead of relying on the bolt connections for force transfer. In this way, the beams will always be movable relative to each other even if the supports are used or stored for a very long time.

For use, transverse bolt 8 toward the rear of lower beam 4, may be fastened by means of simple spring rings. The bolt supports and serves as a stop for third beam 6. At the lower end of beam 5, toward the water is provided flap or lid 9 to serve as a lower stop or support for the loading pallet 1 when the support is in use.

Figure 4:
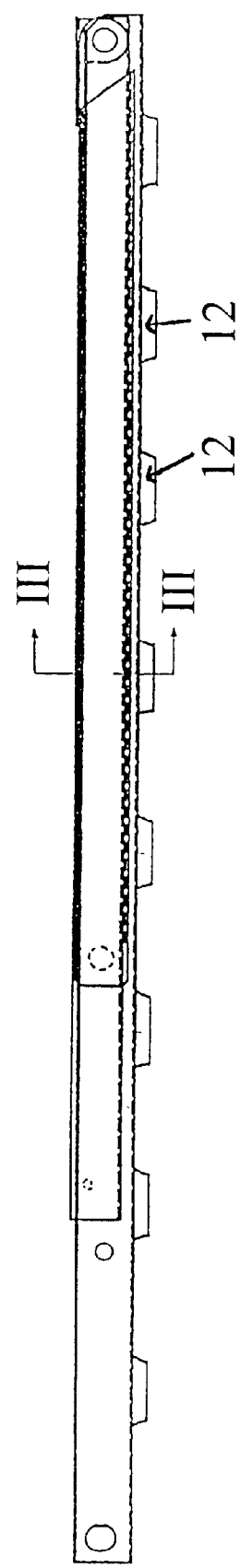
Figure 5:
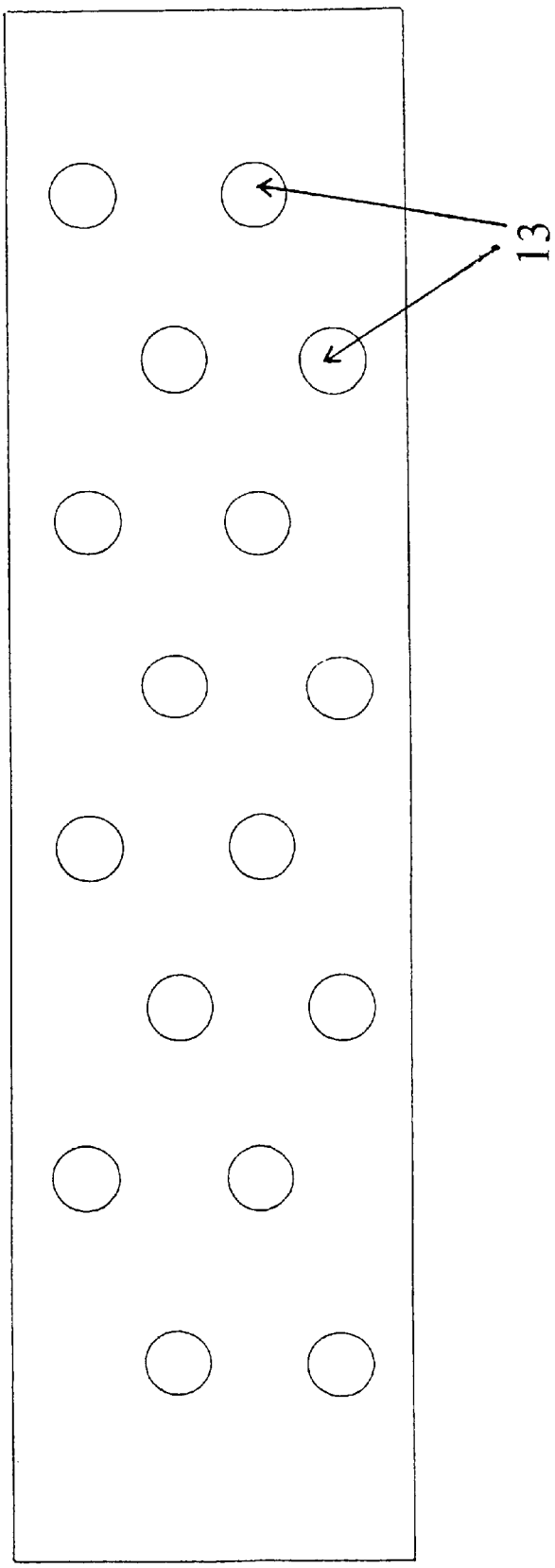
FIG. 5 is a bottom view of the support means in accordance with the present invention.

As shown in FIGS. 2–4 in side view and FIG. 5 bottom view, at the bottom of the lower beam 4 circular collars 12 provide for an increased grip in or on the ground. Each circular collar 12 may have one or more teeth to improve grip. As can be seen in FIG. 5, openings 13 in the collars may also serve as extra anchor points for any object that is inserted therethrough for an increased grip on loose ground. For instance pieces of tubing, pieces of wood or even broken pieces of branches may be used. If the ground is hard, or for example concrete or pavements rubber inserts 20 may be placed in the holes 13 in bottom beam 4 to provide friction with the road surface.

Upper beam 5 has U-shaped flanges turned upwards, preferably having a width slightly larger than double the width of a loading pallet leg. In this way each support may hold two pallets 22a,b together in side by side fashion and no additional means are needed to connect the pallets. This allows easy handling on mounting. Each pallet may be leaned against the preceding support and then the next support may be added, etc. It is not necessary to handle support and pallet simultaneously. In order further to facilitate mounting, the upper beam may be provided with a handle, in the shape of a band running through two slots, for quick and trouble free raising of the support even if visibility is poor and gloves must be used.

If the supporting ability of the ground is poor the support may be placed on a second loading pallet placed up side down so that an even better load distribution is achieved. By turning the second loading pallet up side sown the support may be placed in the downward facing openings normally facing downwards when a loading pallet is used. In this way the inclined upper loading pallet 1 will be only few centimeters higher, and at the same time the bottom supporting surface is increased. Since only a moderate increase in height is obtained, the need for filler 10 at the lower end of the inclined loading pallet 1 will not be markedly increased or otherwise interfere with the membrane.

With reference to FIG. 4, preferably the lower beam 4 is the longest one and has the broadest u-shaped profile. In this way the beams fit into each other for transport and storage as is also shown in FIG. 3.

In order to facilitate the mounting of loading pallet 1, support nail holes 15 shown in FIG. 2 may be provided with which the support device may be fixed to the respecting loading pallet or pallets with a simple nail or screw. Alternatively, holes 15 may also be used for the fastening of the support to the pallets when the pallets are places on their sides. The flanges of the beam do not hold the pallet legs as previously described.

In the flanges of the lower beam 4 and the third beam 6 fixing hole 16 is arranged for the insertion of a small pin locking the support.

Since the loading pallets are made from wood, joining or connecting the dam together at corners and other irregularities may be achieved by nailing of boards or for example, triangular structures or lids to the loading pallet. This can be accomplished very quickly and very simply. Such lids may be provided with hinges and folded flat on the beams during storage and transport.

The support that is described above or varieties thereof can be fabricated in large quantities at low cost and may be stored at a small cost since the size of the device is small. Loading pallets are almost always at hand, in good quantities and a short distance away. For instance most industries as a matter of course always have numerous loading pallets on site, as do wholesale sellers, retailers, etc. In other words, in the event of a sudden catastrophe, a large amount of loading pallets can be collected locally and quickly and can be used to build dams. The only thing that must be purchased in advance are the supports and these, due to their simple structure will not expensive and can be stored in a minimal amount of space. Since almost any waterproof membrane may be used the readiness of the invented method is very high.

The work involved with building a dam of this type is quickly accomplished by placing the support at the intended place and lifting a loading pallet onto the support. Alternatively, mounting of the loading pallet on the support may take place first, for instance, on a truck and then together they may be placed in the intended location and be raised to the proper inclination. Thereafter, the membrane is put on top and its edges fixed in the water or lower end by means of rocks or other materials that are at hand and in the upper end by means of special means or nails staples etc. Then suitable filling that is at hand may be placed between the lower edge of the loading pallet and the ground (if sensitive membranes are used).

The invention provides a great step forward in the fighting of flooding.

Since the loading pallet itself constitutes a well drained structure there is no risk that any water leaking through or past the membrane will build up pressure that can destroy the dam.

When the dam according to the invention has been achieved, it may serve as a base for continued building if a higher dam is needed. It is easy to fasten additional supporting timber in the loading pallets by means of nails or screws. The fastening of for instance an additional row of loading pallets on top of an already existing row of loading pallets is comparatively simple as the arrangement of the required additional supports, whether these are prefabricated or available of loose timber, since the additional timbering or supports may be added peace by piece. When adding height to the dam one must of course remember to provide additional lateral support since otherwise the entire dam might tilt over. The loading pallets of the standard European type will give a dam height of 65 or 100 centimeters depending on pallet orientation.

It is also possible to construct supports intended for greater dam height, for instance, two pallets high or units specially designed to add on to the above described supports, constituting an upper extension beam and a number of inclined support beams or struts that in their lower end may reset on one or several beams below and, that may be adaptable to uneven ground by being fastenable to each other in different positions.

Tests with the invention have shown that one person easily in one day may build 200–300 meters of dam. A moderate size swimming pool or fire dam can be built by one person in a quarter of an hour. A house can be protected in a matters of hours by one person. With a barrier height of one meter each single pallet corresponds to the use of 50 sandbags each weighing 30 kg.

The use of the dam of the invention is not limited to flooding but may also be used to achieve channels or basins of different kinds, for example swimming pools, or for the storage of polluted water, sludge, manure, urea, contaminated earth, ash, waste, etc. or, a barrier may be erected for drying water areas, for instance at building in water (bridges, piers, outlets and inlets to artificial bathing lakes etc.).

What is claimed is:

1. Method for the fabrication of a temporary dam or barrier, which comprises moving a prefabricated folded support structure to a desired location, unfolding and erecting the support, inclining loading pallets against said unfolded erected support, and placing a watertight membrane over the pallets and extending said membrane for a distance in front of the pallets.

2. Method according to claim 1, wherein the membrane is fixed to the upper edge of the loading pallets.

3. Method according to claim 1, wherein the membrane extending for a distance in front of the loading pallets is held down in place by sand bags, or rocks.

4. Method according to claim 1, wherein the front edge of the membrane extending for a distance in front of the pallets is fixed to the ground.

5. Method according to claim 4, wherein the front edge of the membrane is buried into the ground.

6. Method according to claim 1, wherein the portion of the membrane bridging between the lower end of the loading pallet and the ground is supported by gravel or fill.

7. Method according to claim 1, wherein the pallets are inclined such that the rearmost support point against the ground lies behind the point at which pressure forces on the loading pallet intersect the ground, and that the inclination is sufficient to provide vertical force on the ground sufficient to prevent the dam from being pushed sideways on the ground.

8. A support for the execution of the method according to claim 1, and comprising three beams, a base beam, an upper beam and a linking beam, that on use are connected to form a triangle, and when not in use may be stored flat.

9. A support according to claim 8, wherein the beams comprise U-beams with different widths, that when not in use can be stored in each other.

10. A support according to claim 8, wherein one of the beams is permanently hingedly joined at its ends to one end of each of the other two beams while the other respective ends of the two beams are detachably hingedly joined to each other.

11. A support according to claim 8, wherein the base beam is provided with openings to improve grip on the ground.

12. A support according to claim 8, wherein the base beam is provided with teeth or rubber inserts to improve grip on the ground.

13. A support according to claim 8, wherein the upper beam is U-shaped and has a width sufficient to hold two loading pallets in side-by-side relationship.

14. A support according to claim 8, and comprising ground gripping means associated with the base beam.

15. A support according to claim 8, and comprising extension means affixed to the upper beam for increasing the height of the support.

16. Method according to claim 1, wherein the front edge of the membrane extending for a distance in front of the pallets is sealed to the ground.

* * * * *